(12) United States Patent
Avital

(10) Patent No.: US 10,089,449 B2
(45) Date of Patent: Oct. 2, 2018

(54) SYSTEM, METHOD, AND DEVICE FOR CONTROLLED ACCESS TO A NETWORK

(75) Inventor: David Avital, Tel-aviv (IL)

(73) Assignee: David Avital, Raanana (IL)

( * ) Notice: Subject to any disclaimer, the term of this patent is extended or adjusted under 35 U.S.C. 154(b) by 0 days.

(21) Appl. No.: 13/482,933

(22) Filed: May 29, 2012

(65) Prior Publication Data

US 2013/0263217 A1    Oct. 3, 2013

Related U.S. Application Data

(60) Provisional application No. 61/686,149, filed on Apr. 2, 2012.

(51) Int. Cl.
*G06F 21/00* (2013.01)
*G06F 21/31* (2013.01)

(52) U.S. Cl.
CPC .................................. *G06F 21/31* (2013.01)

(58) Field of Classification Search
None
See application file for complete search history.

(56) References Cited

U.S. PATENT DOCUMENTS

| | | | | |
|---|---|---|---|---|
| 7,292,870 B2* | 11/2007 | Heredia | ..................... | G06F 8/60 455/3.01 |
| 7,548,744 B2* | 6/2009 | Oesterling | .............. | H04L 63/08 455/410 |
| 7,606,370 B2* | 10/2009 | Lillie | ................... | H04L 63/061 380/247 |
| 7,757,274 B2* | 7/2010 | Lillie | ................... | H04L 63/061 709/225 |
| 7,853,788 B2* | 12/2010 | Fascenda | .............. | H04L 9/3271 713/155 |
| 7,934,660 B2* | 5/2011 | Yeakley | .............. | G06F 17/2247 235/462.01 |
| 8,185,935 B2* | 5/2012 | Hsu | ........................ | H04L 63/10 380/270 |
| 8,555,364 B2* | 10/2013 | Filippi | ................ | H04L 63/0272 380/270 |
| 2006/0224885 A1* | 10/2006 | Lillie | ................... | H04L 63/061 713/153 |

(Continued)

OTHER PUBLICATIONS

Zhao, Jia et al. Enabling Multi-Hop Communications Through Cross-Layer Design for Hybrid WSNs with Transmit-only Nodes. 2011 IEEE Global Telecommunications Conference (GLOBECOM 2011). Pub. Date: 2011. https://ieeexplore.ieee.org/stamp/stamp.jsp?tp=&arnumber=6133950.*

(Continued)

*Primary Examiner* — Jeremiah Avery
(74) *Attorney, Agent, or Firm* — Pearl Cohen Zedek Latzer Baratz LLP

(57) ABSTRACT

A device for controlling network access comprising a first transceiver configured in as open access point device, a second transceiver configured in client mode and configured to connect to a second network, and a human detectable output device. The first transceiver device is configured to request and receive a user access security key. Upon matching the output and received security keys, data access to the network is enabled. Further, the device limits the addresses to which a user client device can transmit data. The user access security key required for the connecting to the first transceiver is time varying.

19 Claims, 5 Drawing Sheets

(56) References Cited

U.S. PATENT DOCUMENTS

| | | | | |
|---|---|---|---|---|
| 2007/0233860 A1* | 10/2007 | Lillie | .................... | H04L 63/061 709/225 |
| 2008/0076392 A1* | 3/2008 | Khetawat | .............. | H04L 63/123 455/411 |
| 2008/0304458 A1* | 12/2008 | Aghvami | .............. | H04W 48/16 370/338 |
| 2009/0279701 A1* | 11/2009 | Moisand | ............... | H04L 12/185 380/270 |
| 2011/0302630 A1* | 12/2011 | Nair | ........................ | G06F 21/41 726/4 |
| 2012/0102550 A1* | 4/2012 | Newman | .............. | H04W 12/06 726/4 |

OTHER PUBLICATIONS

Wang, Zhigang et al. Ad-hoc Robot Wireless Communication. 2003 IEEE International Conference on Systems, Man and Cybernetics. Pub. Date: 2003. https://ieeexplore.ieee.org/stamp/stamp.jsp?tp=&arnumber=1244520.*

Aghdasi, Hadi S.; Abbaspour, Maghsoud. ET-MAC: An Energy-Efficient and High Throughput MAC Protocol for Wireless Sensor Networks. 2008 6th Annual Communication Networks and Services Research Conference. CNSR 2008. Pub. Date: 2008. https://ieeexplore.ieee.org/stamp/stamp.jsp?tp=&arnumber=4519903.*

* cited by examiner

SYSTEM, METHOD, AND DEVICE FOR CONTROLLED ACCESS TO A NETWORK

RELATED APPLICATIONS

This application claims priority under 35 U.S.C. § 119(e) of the U.S. provisional patent application Ser. No. 61/686,149 filed on Apr. 2, 2012, and titled "METHOD OF AND SYSTEM FOR AGGREGATING AND PUSHING STATUS UPDATES TO CLIENT DEVICES; SYSTEM METHOD AND DEVICE FOR CONTROLLED NETWORK ACCESS." The provisional patent application Ser. No. 61/686,149 filed on Apr. 2, 2012, and titled "METHOD OF AND SYSTEM FOR AGGREGATING AND PUSHING STATUS UPDATES TO CLIENT DEVICES; SYSTEM METHOD AND DEVICE FOR CONTROLLED NETWORK ACCESS" is hereby incorporated by reference.

FIELD OF THE INVENTION

This invention relates generally to electronic processing systems, methods and devices for the controlling access to a wireless network.

BACKGROUND

Often, for a mobile device to gain access to a wireless network, an encryption or security key is required. By giving out the key, controlled access to the network is lost. The key can be given to others, it can be used without limit, at any time, and for any purpose. Alternatively, the wireless network can be left open allowing anyone to connect to it and thus resulting in the same problem. Another problem with an open network is that some wirelessly accessible devices are not protected by a firewall or by other security measures. Devices such as a NAS (network attached storage) do not have built in firewalls and are vulnerable to any person that can connect to a wireless network with a NAS attached. What is needed are a system, a method, and a device for controlling access to the wireless network.

Further, there is not a good automated way to automatically to obtain the security key for a wireless router without having to manually enter the key. Exemplar of these security keys are such as a WEP, WPA, WPA2 or any other security key defined by the Wi-Fi Alliance. What is also needed is an automated means to provide these security key to a predetermined list of wireless device.

SUMMARY OF THE INVENTION

In one aspect of the present invention, a device provides controlled network access. The device is comprised of a first transceiver and associated control electronics that is configured as a wireless access point router or hub. The device includes a second transceiver that is configured as a wireless client device that is configured to connect to a second wireless access point router that provides connectivity to the Internet or other larger networks. The device is configured to establish user client device connections with the access point first transceiver. The device is configured to retransmit data received from client devices connected to the first transceiver. The data is retransmitted by either the first transceiver over the first network or the second transceiver over the second network to the second access point router or hub connected to the Internet or another network.

The device includes a human detectable output device that outputs a user access security key, a client device is required to provide the user access security key to enable data retransmissions.

In another embodiment, the first transceiver includes a security mode where a web page or other means for a user to enter a security key is transmitted to a user client device through the user client connection. The device is configured to receive a user client security key from the user client connection. If the user client security key does not match the user access security key, then received data from the user client connection will not be retransmitted either on the first or second transceiver.

In another embodiment, the device further generates and changes the user access security key to the new user access security key based on a configurable parameter. The security key change can be based on but not limited to a time limit, number of connected users, or time of day. Client devices connected to the device will remain connected until the connection is ended even it the user access security key changes.

In a further embodiment, the device stores an identifier for each client device that connects to the first transceiver. Based on the identifier, the retransmission of data can be restricted by the destination address. The addresses can include but is not limited to the URL (Uniform Resource Locator) and IP (Internet Protocol) address, or an MAC (Media Access Control) address. Further, additional processing can be performed on a per client connection including limiting the time for which a client device is allowed to be connected. Additionally, the wireless networks communication standards and protocols can be based on IEEE 802.11(a, b, g, and n).

In some embodiments, one of the two transceivers is a virtual transceiver. The virtual transceiver shares the antenna and some or all of the radio frequency electronics, the digital signal processor, and protocol processor and stack with the other transceiver.

In another aspect of the present invention, a process to control access to a network is disclosed. The process is comprised of the steps of configuring a first transceiver as a wireless access point router thereby forming a first wireless network, configuring a second transceiver as a wireless client device and connecting to a second network, outputting a client access security key in a human detectable form, forming a user client connection with the first transceiver, transmitting data received from the first network by the first transceiver on either the first transceiver over the or the second transceiver over the second network, and transmitting data received by the second transceiver from the second network on the first transceiver over the first network.

In another embodiment, the process further includes the steps of outputting a Web page to a client device and receiving a user client security key over the user client device connection. The retransmission of data received from the first network by the first transceiver through the device is enabled when the user client security key matches the client access security key.

In a further embodiment, the process includes the steps of changing the client access security key at predetermined times. The changed access security key is output in a human detectible manner.

In another embodiment, a client device unique identifier is received. The identifier can be used to track whether the client device has provided a correct user access security key for the current client device connection. Further, data received from the client device connection can be filtered based on the destination addresses in the received data. The data address can include but is not limited to a URL, IP address or a MAC address.

The first and second transceiver are can be configured to implement the transmission standards and protocols of IEEE 802.11(a, b, g, and n). In some embodiments, the output of the human detectable device is by one or more of a visual display, an audio output, and a printed output. In other embodiments, the first or second transceivers are configured to be a virtual transceiver wherein both the first and second transceiver share the same antenna, radio frequency electronics, and digital processing electronics.

DETAILED DESCRIPTION OF THE INVENTION

The following description of the invention is provided as an enabling teaching of the invention. Those skilled in the relevant art will recognize that many changes can be made to the embodiment described, while still attaining the beneficial results of the present invention. It will also be apparent that some of the desired benefits of the present invention can be attained by selecting some of the features of the present invention without utilizing other features. Accordingly, those skilled in the art will recognize that many modifications and adaptations to the present invention are possible and can even be desirable in certain circumstances, and are a part of the present invention. Thus, the following description is provided as illustrative of the principles of the present invention and not a limitation thereof.

Figure 1:
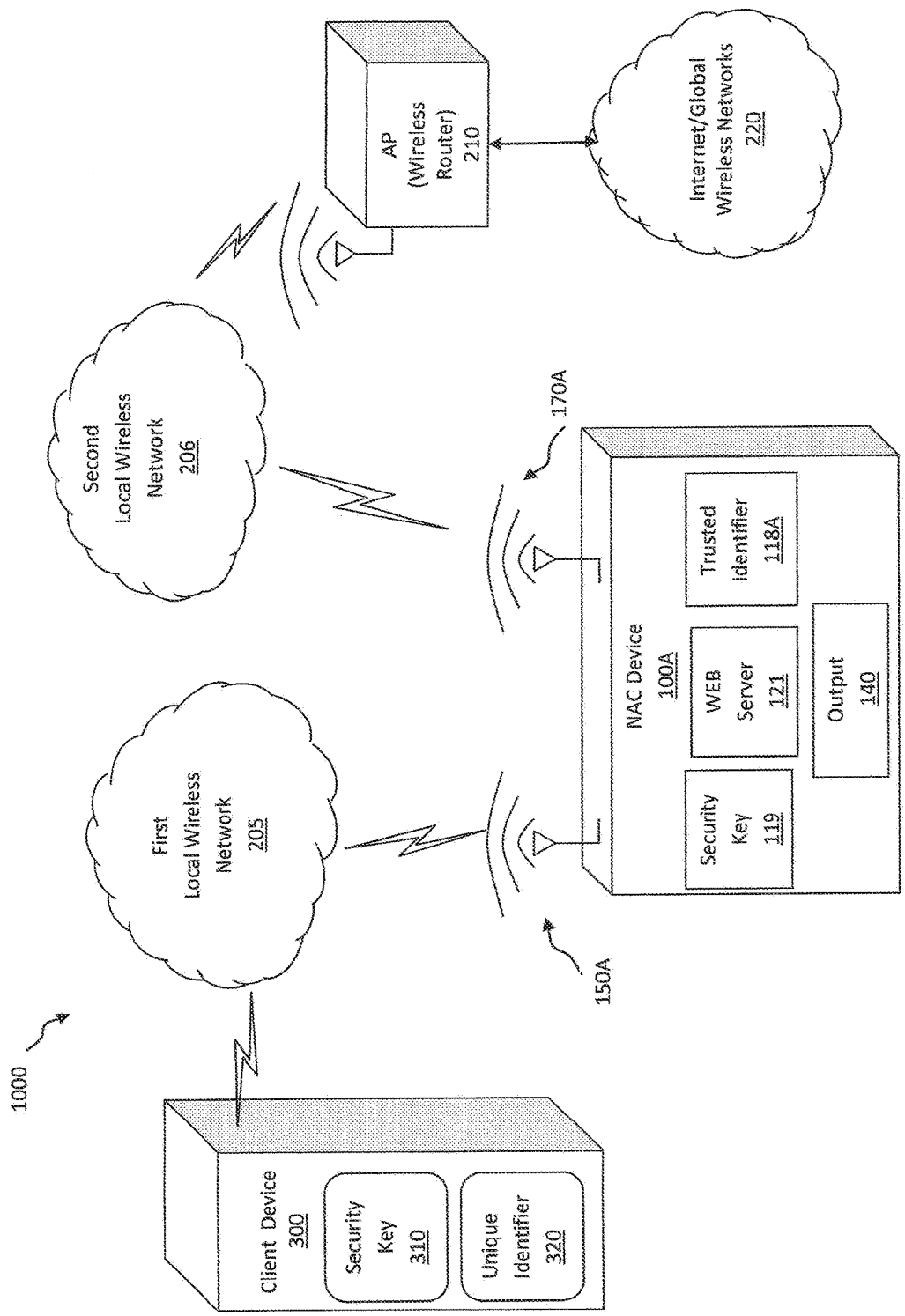
FIG. 1 is a block diagram illustrating an exemplary network environment used in accordance with certain embodiments of the invention.

FIG. 1 is a schematic depiction of a system 1000 for controlled access to a wireless network. An NAC (Network Access Control) device 100A is configured with two wireless transceivers 150A, 170A and associated control electronics. The associated control electronics can include processors that implement the wireless protocol stacks, digital signal processing, and any processing need to implement controlled access to the wireless network or Internet. This processing can include analyzing the destination address of client device 300 data packets preventing and limiting types of connections. For example, connection only to the Internet 220 may be allowed but no connections to other devices connected to the NAC 100A over the first local wireless network 205. For example a coffee shop that has multiple users using the network and may want to prevent one user from trying to access another user's computer. In the home environment, devices without a firewall, such as a NAS (Network Attached Storage device), will be protected from devices connecting through the first transceiver 150A.

The first transceiver 150A is configured as an AP (access point) device and the second transceiver 170A is configured as a client device. The first transceiver 150A forms a first wireless network 205 to which a wireless client device 300 can connect. The second transceiver 170A connects to the second wireless network 206 formed by a second AP wireless router 210 that can be coupled to a larger network including but not limited to the Internet.

The NAC device 100A includes a human detectible output device 140. The output device 140 provides a wireless client device 300 user the security key 119 required to connect to the first local wireless network 205. The benefit of outputting the security key 119 in a human detectable form is that it requires that a user gain close physical proximity to the NAC 100A to get the user access security key and thus gain network access. A security key can include an encryption key, a token, a login, a password, or any other sequence or combination required to access a network. The ability to physically access the NAC 100A implies that the user is a trusted person or alternatively potentially a customer within proximity of the NAC 100A such as a customer within a store. The human detectable output device 140 can include but is not limited to a visual display, audio output, or printer output.

Preferably, the first wireless transceiver 150A is an open connection and does not require a WEP (wired equivalency privacy) key for a wireless client device 300 to connect to the NAC 100A. Controlled access to the NAC 100A is provided by the NAC 100A being configured to transmit a web page or some other human readable format to the wireless device 300. The web page or other human readable format displayed on the wireless device 300 provides for the entering of a client device security key 310. The entered client device security key 310 needs to match the user access security key output by the display device 140 to gain access to the Internet through the NAC 100A.

Further, the NAC 100A can be configured to track, control, filter, block, record, and process data received from each wireless client 300 that connects through the first network 205 to the NAC 100A. The processing can be based on an identifier provided by the wireless client device 300. When each wireless device 300 connects to the NAC 100A, the device 300 provides a unique identifier 320. The identifier 320 can be any device unique identifier, preferably the MAC (machine access control) identifier that is provided to the NAC 100A device for wireless connections following the IEEE 802.11(a, b, g, and n) standards and protocols. Preferably, the NAC 100A restricts the addresses to which data from the client device 300 can send data. The restrictions are preferably base on destination addresses. These addresses can include URL's, IP addresses, or MAC addresses.

Additionally, the NAC 100A can be configured to process data from the wireless device 300. Processing can include but is not limited to time limiting a connection, blocking access to particular web sites, tracking usage, encryption, or providing a web page to the client for advertising or customer rewards, or IP forwarding.

The network is comprised of any global or private packet network or telecom network including but not limited to the Internet and cellular and telephone networks 220, and access equipment including but not limited to wireless routers 210. Preferably the global network 220 is the Internet and cellular network running standard protocols including but not limited to TCP, UDP, and IP. The cellular network can include cellular 3G and 4G networks, satellite networks, cable networks, associated optical fiber networks and protocols, or any combination of these networks and protocols.

Figure 2:
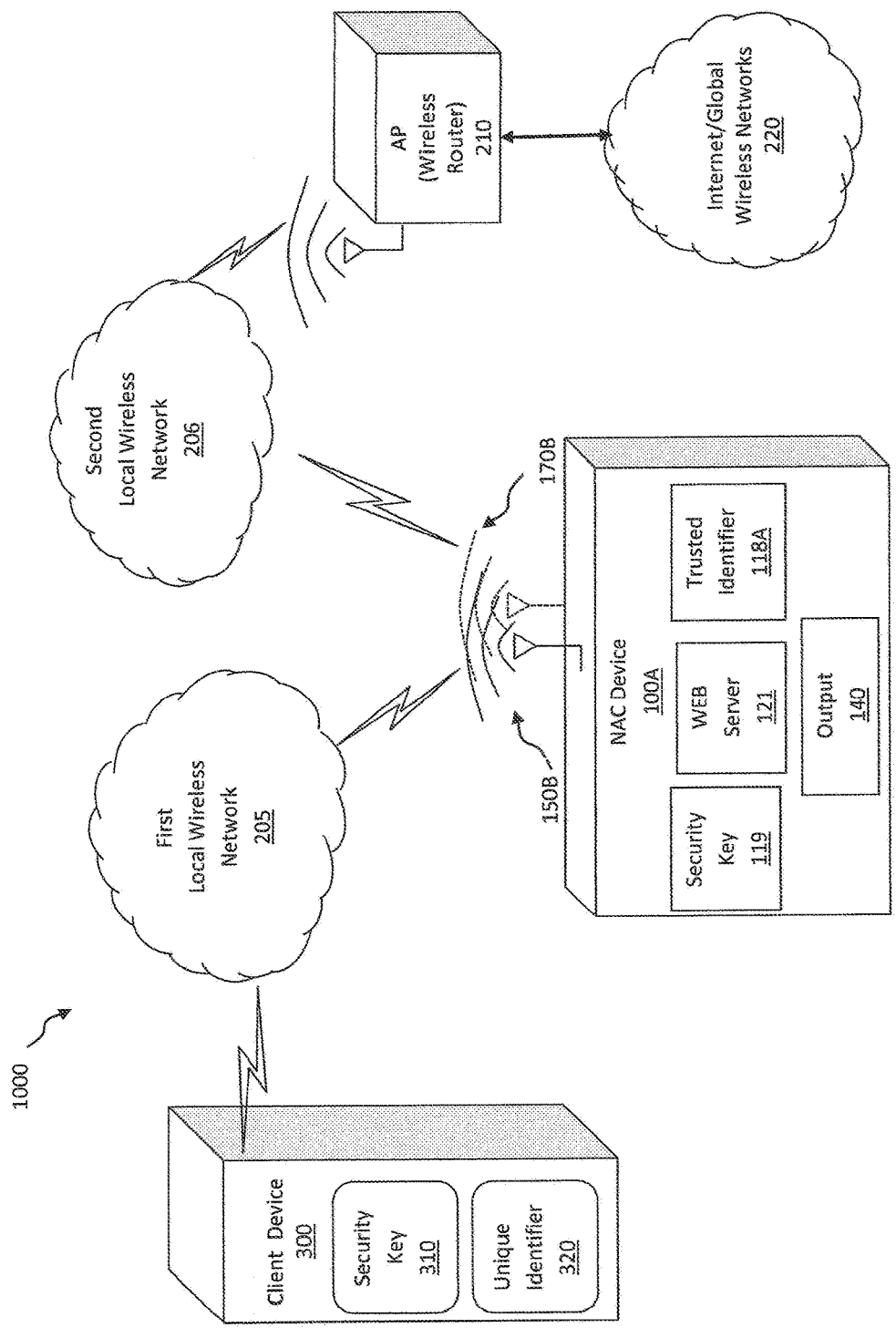
FIG. 2 is a block diagram illustrating an exemplary system environment with a virtual transceiver used in accordance with embodiments of the invention.

FIG. 2 is a schematic depiction of a system 1000B for controlled access to a wireless network. An NAC device 100B is configured with a wireless transceiver 150B, a virtual transceiver 170B, and associated control electronics.

For the purposes of this invention, a virtual transceiver means that the virtual transceiver 150B shares the same antenna, radio transmitter, and receiver and electronics with the first transceiver 150B. The sharing can be performed through an RF (radio frequency) mixer that mixes the signal from the Access Point electronics and the signal from the Client mode electronics. Alternatively, the sharing can be performed by digitally mixing the digital representation of the signal representing an Access Point protocol signal and the digital signal representing a wireless Client protocol signal. Further, the NAC device 100B can include processing electronics and logic to control the mixing of the transmissions to minimize interference between the Access Point transmissions and the Client transmissions.

The first transceiver 150B is configured as an access point device and the second virtual transceiver 170B is configured as a client device. However, this configuration can be reversed where the Access Point transceiver is the virtual transceiver and the Client device is the transceiver device.

The first transceiver 150B forms a wireless network 205 to which a wireless client device 300 can connect. The virtual client transceiver 170B connects to the wireless network 206 formed by a second AP wireless router 210 that can be coupled to a larger network including but not limited to the Internet.

The NAC device 100E includes a human detectible output device 140. The output device 140 functions in the same manner as described above for FIG. 1. Also, the NAC 100B can include a web server that functions as described above for FIG. 1.

Further, the NAC 100B can track each wireless client 300 that connects through the first network 205 and process data from the wireless device 300 as described above for FIG. 1. The local wireless network 206 and other networking equipment 210, 220 are as described above as for FIG. 1.

Figure 5:
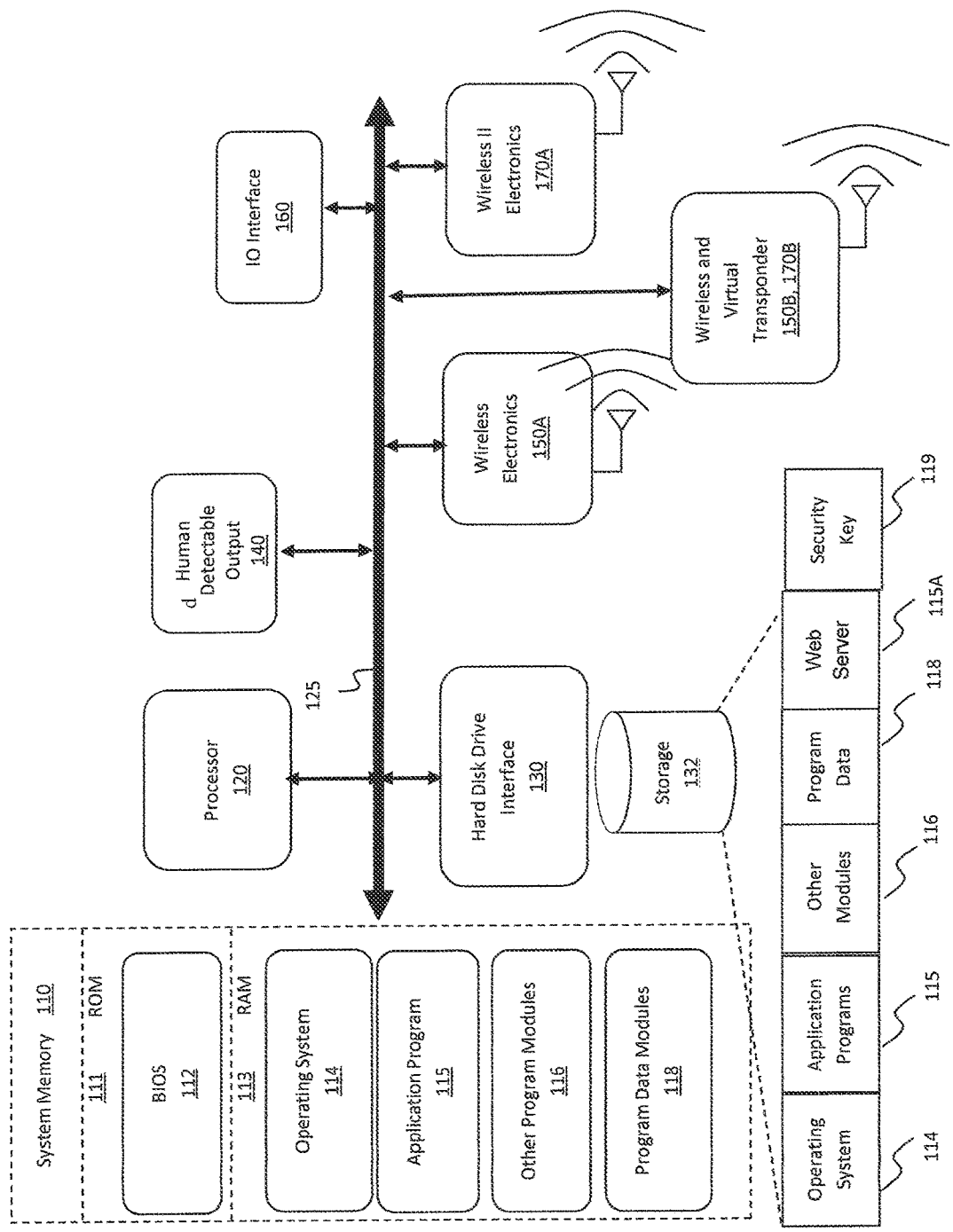
FIG. 5 is a block diagram of an exemplary computing device suitable to implement a network access control device.

Referring to FIG. 5, a schematic depiction is shown of one embodiment of a NAC device 100 that can be used in accordance with the invention. The NAC 100 is a self-contained digital system that includes a processor 120, system memory 110, storage 132, a bus 125, and wireless communication electronics 150A, 170A for providing an access point router and client communications, and output device for security keys. The NAC 100 contains machine executable instructions that configure one wireless communication transceiver 150A for acting as an access point router or hub and the other wireless communication transceiver 170A as a wireless client device.

The bus 125 represents one or more of any of several types of bus structures, including a memory bus or memory controller, a peripheral bus, and a processor or local bus using any of a variety of bus architectures. The system memory 110 includes ROM 111 (read only memory) and RAM 113 (random access memory). The ROM 111 comprises a BIOS 112 (basic input/output system) that contains basic routines for transferring data between elements within the NAC 100 such as during start-up. The NAC 100 further includes a storage drive interface 130 for reading from and writing to storage 132.

The storage device 132 provides nonvolatile storage of computer readable instructions, data structures, program modules, and other data for the NAC 100. Although the exemplary environment described herein employs solid state memory, it will be appreciated by those skilled in the art that other types of computer readable media which can store data that is accessible by a computer, such as hard disks, magnetic cassettes, flash memory cards, RAMs, ROM, and the like, can also be used in the exemplary operating environment. A number of program modules may be stored on the storage 132, including an operating system 114, one or more application programs 115 including the NAC application, other program modules 116, and program data 118.

The processor 120 can be any processor with sufficient processing power to support wireless connectivity and sufficient memory address space to support applications for forwarding and receiving data from the transceivers 150A, 170A, filtering data, and processing data. Preferably, the processor 120 requires minimal power and has a small foot print. A low power NAC 100 is a device that can be powered by a wall plug. Preferably the processor 120 is part of an integrated device with system memory 110 and storage 132 and possibly other components such as a means for low power wireless transmissions.

The wireless communication electronics 150A, 170A can be for any type of wireless communication standard where the access point provides a device identifier and the client device maintains a list of detected access point devices. Preferable, the wireless transmission supports wireless communication means commonly found in wireless networks. The wireless standards IEEE 802.11 WiFi and IEEE 802.15 Bluetooth are two common communication standards that are commonly found on mobile devices.

In some embodiments, one of the transponders is a virtual transponder. The virtual transponder shares the antenna and radio frequency transmission and receptions electronics. The transmissions for the Access Point and Client functions are mixed together.

Figure 3:
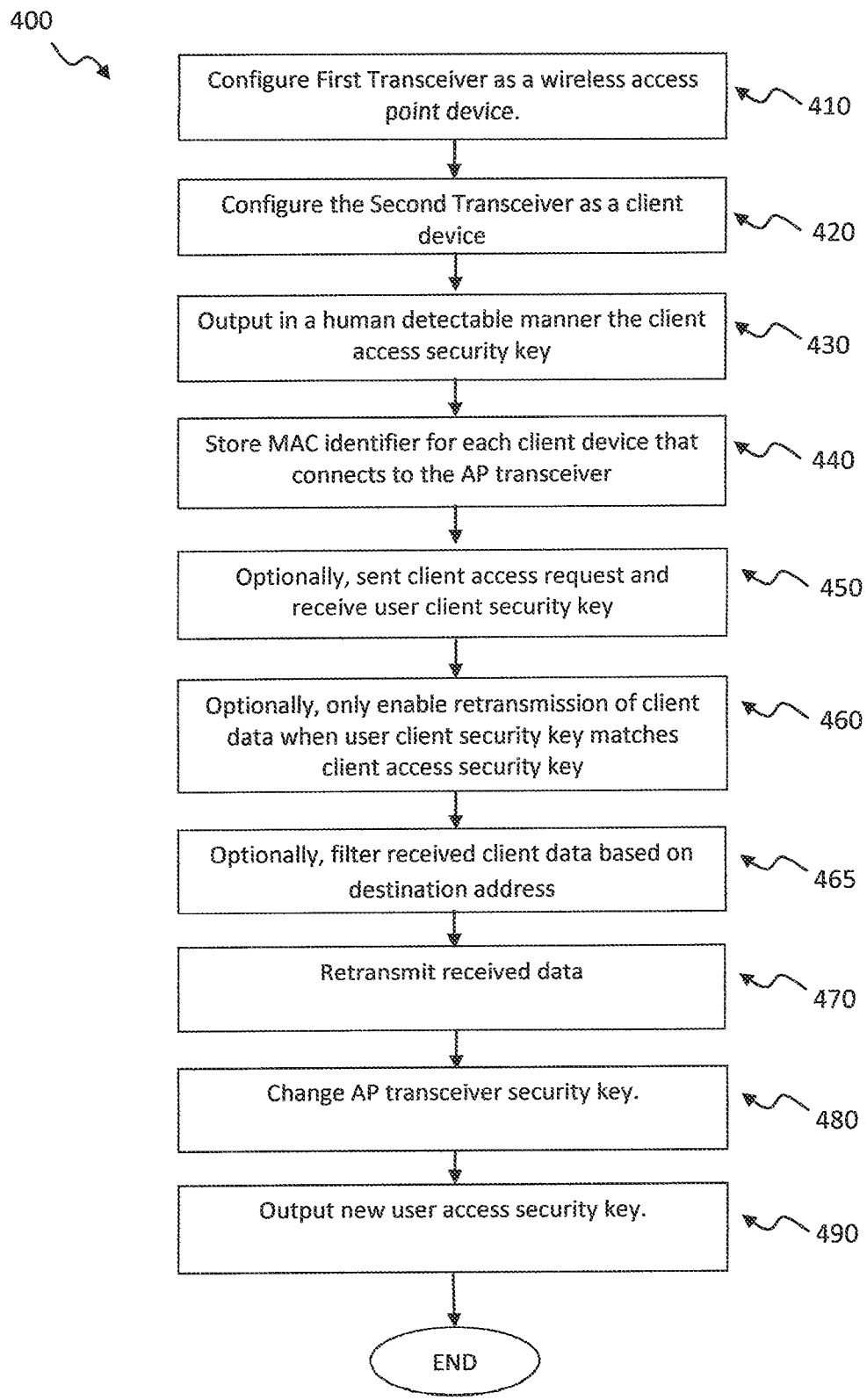
FIG. 3 is a process diagram showing the step for providing controlled access to a network.

Referring to FIG. 3, a process diagram for controlling access to a wireless network is shown. The processing steps include various embodiments of the invention. Some steps can be excluded in different embodiments of the invention.

In a step 410 a first wireless transceiver and associated electronics and software are configured as a wireless AP (Access Point) device. This configuration preferably configures the first wireless transceiver to conform with IEEE 802.11(a, b, g, and n) WiFi standards and protocols. A user client connection is formed with the first transceiver.

In a step 420, a second transceiver and associated electronics and software are configured as a client device. Preferably the second transceiver is configured to connect with a second wireless router or hub that has connectivity with the Internet or other larger networks. Preferably the second wireless transceiver is configured to conform with IEEE 802.11(a, b, g, and n) protocols and transmission standards for WiFi devices.

In a step 430, a client access security key is output in a human detectably manner. This can include but is not limited to a display, audio device, or printer.

In a step 440, the device stores an identifier for a wireless device that connects to the first transceiver. Preferably the identifier is the MAC (media access control) identifier.

In an optional step 450, a request for a user access security key is sent to the client device. The client device sends an client device security key.

In an optional step 460, retransmission of the data received from the user client connection is enabled when the user access security key matches the user client security key.

In an optional step 465, data receive from the client connection is only filtered by destination address. The destination address can include but are not limited to uniform resource locators, IP addresses, and MAC addresses.

In a step 470, data received in on the first transceiver is retransmitted on the second network using the second transceiver.

In a step 480, the user access security key is changed to a new user access security key. Client devices connected under the former security key will remain connected until the connection is terminated. Reconnection will require connection based on the new user access security key.

In a step 490, the new user access security key is output on the human detectable output device.

Figure 4:
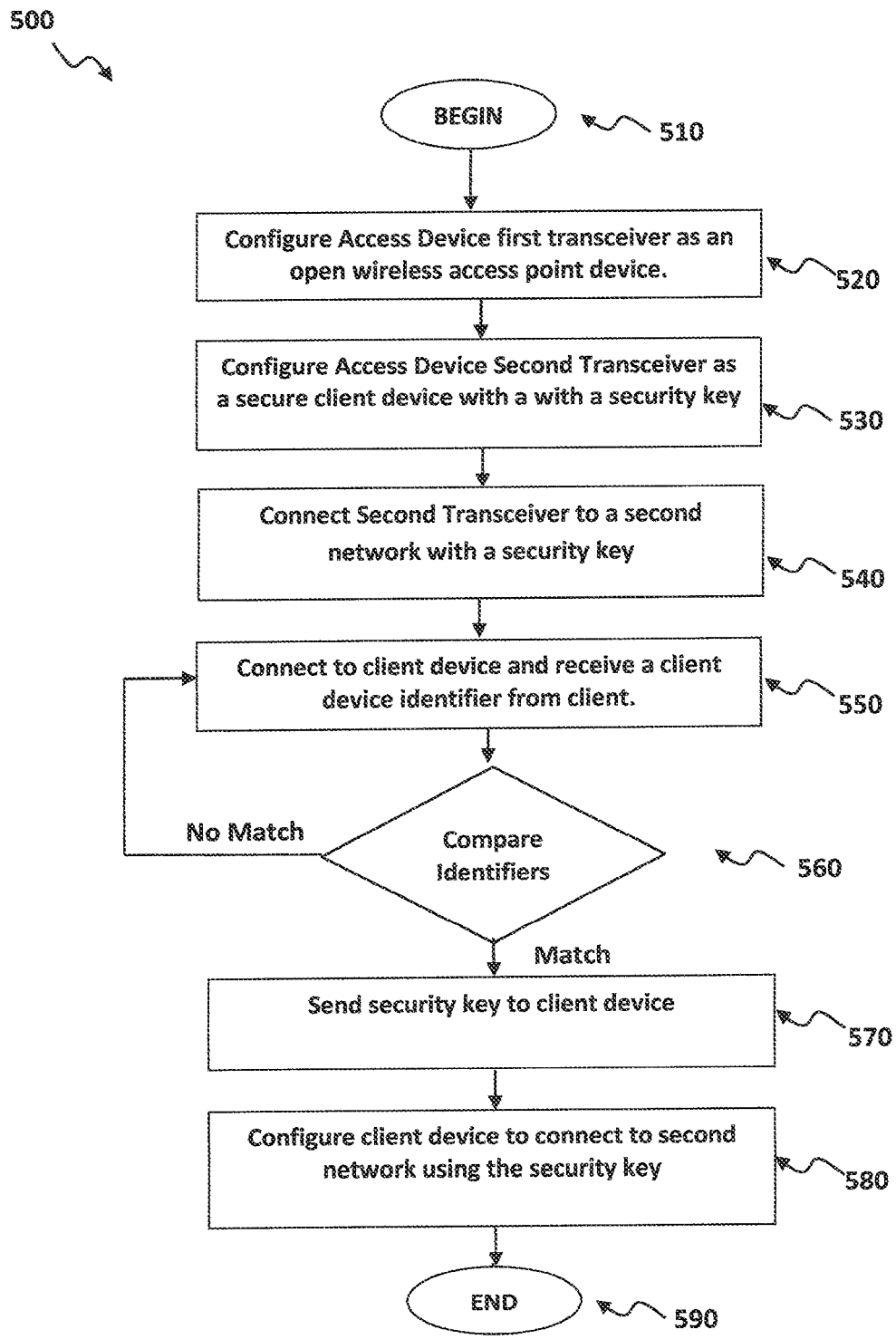
FIG. 4 is a process diagram showing the steps for controlled access to a secured network.

Referring to FIG. 4, a process diagram for configuring and controlling access to a secure wireless network is shown. In the described embodiment, the process is for accessing a secure wireless network where the network control device has or has access to a registered device identifiers for which access is allowed or prevented. The process steps include various embodiments of the invention. Some steps can be excluded in different embodiments of the invention.

In a step 510 the process begins for a wireless device to gain access to a secured wireless network. In a step 520, a first wireless transceiver and associated electronics and software are configured as a wireless AP (Access Point) device. This configuration preferably configures the first wireless transceiver to conform with IEEE 802.11(a, b, g, and n) WiFi standards and protocols but other wireless standards are contemplated. A user client connection is formed with the first transceiver.

In a step 530, a second transceiver and associated electronics and software are configured as a client device. Preferably the second transceiver is configured to securely connect with a second wireless access point device that has connectivity with the Internet or other larger networks. Preferably the second wireless transceiver is configured to conform with IEEE 802.11(a, b, g, and n) protocols and transmission standards for WiFi devices and where the security key is a WEP, WPA or WPA2 key and a network name for the second wireless access point device.

In a step 540, the second transceiver establishes a secure connection with a second access control device on a second network. In the establishment of a secure connection, the second transceiver needs to provide a security key to the second access control device. For network compliant with the IEEE 802.11(a, b, g, and n) WiFi standards and protocols and the security key includes the network name the WEP, WPA, or WPA2 key.

In a step 550, a user client connection is formed with the first transceiver on and access control device. Connection means the exchange of all information required to exchange data between the user client device and the first transceiver. Preferably the connection with the first transceiver is open where a security key is not requires and thus a WEP, WPA, or WPA2 key is not needed. Further, in the connection process, the client device provides an identifier for the client device. Preferably, the identifier is unique and is the MAC address for the device.

In a step 560, the identifier provided by the client device is compared with one or more registered identifiers. The registered identifiers can be downloaded to the access device. Alternatively, the received client identifier is sent to a network coupled service where the comparison is performed. The results of the comparison is sent back to the access control device. If the client identifier matches a registered identifier, then the process continues. If the identifiers do not match, then the process goes back to step 550 waiting for another client device to connect.

In a step 570, the access control device sends through the first open transceiver the security key needed to access the second secure network. The security key can include a WEP, WPA, or WPA2 key In a step 580 the client device is configured to connect to the second secure network using the security key. This step can include the establishing the connection.

In a step 990, the process ends. Optionally the process can repeat or can return to set 550 where the process waits for another client device to connect to the open second network.

Operational Example One

In operation, a NAC 100A powers up and configures the first transceiver 150A to access point mode and the second transceiver 170A to client mode. The transceivers and associated electronics can implement but are not limited to the wireless communication standard specified in the IEEE 802.11(a, b, g, and n) specification. A wireless client device 300 which can be mobile devices connects to a first local wireless network 205 formed by the first transceiver 150A. The transceiver 170A is configured as a client device that connects to the second wireless network 206 formed by the second access point router 210. Preferably a security key is required to access the second access point router 210 otherwise the client device would be able to get direct access to the Internet or other networks 220 by a directly connecting to the second wireless router 210. This security key is sometimes referred to as a WEP (wired equivalent privacy), or WEP2 key.

The user of the client device 300 needs to be in close proximity to the NAC 100A. The NAC 100 will output in a human detectably manner a user access security key 119 needed to connect to the first wireless network 205. The output device 140 can be a visual display of characters. Alternatively, the security key 119 can be output by other human detectable means including audio, printed, tactile or a combination thereof. Further, the invention contemplates the use of close proximity non-human detectable means for transferring a security key. These include but not limited to using near field communication devices or very low power Bluetooth devices for the transfer of the user client security key from the NAC 100A to the user client device 300.

The NAC 100A AP (access point) transceiver can be configure to be open, not requiring a WEP key for a client to connect to it. The displayed user access security key is used as a login or password to gain access to services and Internet access through the NAC 100A. Upon connecting, the NAC 100A will push a Web page to the client device 300 that incorporates the input of the user access security key. The advantage of this method is that the user access security key can be changed but the logged in client devices 300 can maintain their connection.

In the process of connecting to the NAC 100As, the client device 300 provides a unique identifier. The identifier can be any client device unique identifier 320. Preferable the client device unique identifier 320 is the MAC address that is provided by the client device when it connects to an AP device. The MAC address can be used by the NAC 100A for tracking client devices that have provided a valid user access security key, and other client connection based processing. This processing can include, access by time of day, length of time, amount of data received or sent or a combination thereof. Processing of the data can include but is not limited to blocking data transmission based on destination address including IP and Web URLs addresses.

Data received by the first wireless transceiver 150A is sent to the second wireless transceiver 170A for retransmission to the Internet 220 through the second wireless router 210.

At a predetermined times, the NAC device 100A will change the security key 119 and again output it. For example, at midnight, that security key could be changed to a new random sequence of numbers and characters. Preferably, internal logic of the NAC 100A is used to track each client user by MAC address. Thus, the length of time that a client devices 300 already connected to the NAC 100A can be controlled by internal logic such as timers. New or returning client devices 300 will have to use the current user access security key. Thus, a user of the NAC device 100A has to come periodically within physically proximity of the NAC device 100A to get the new user access security key. Having physical access to the device 100A provides control over who has access to the Internet or other client devices connected to the first wireless network 205.

Operational Example Two

In another aspect of the invention, the NAC 100A provides a network access device for automatically checking in, i.e. connecting, a wireless device 300 to a wireless hub/router where the wireless device 300 automatically receives a security key. The security key can be the WEP, WPA, or WPA2 key and network name for accessing a secure network. In this aspect of the invention, the first and second transceiver is configured as specified above in the prior operational example. When the wireless client 300 connects to the open first transceiver 150, the NAC 100A checks the device unique identifier 320 (MAC address) received by the first wireless receiver 150A. If the device unique identifier 320 matches a configured or downloaded registered identifier 118A, then the NAC 100A will send to the client device 300 a WEP key, network name, and any other information needed to connect to the second AP wireless router 210 over the second wireless network network 206. The client device 300 will then connect to the second network.

In this embodiment, registered identifier 118A can include a known or previously registered client device 300. It can included downloaded list of registered identifiers or the unique client identifier can be transmitted to a network coupled service that authorizes the access and the authorization sent back to the NAC 100A. Further, it can include client identifiers to be excluded from connecting to the network where the WEP key or other security key to the second network 206 is not provided if the unique identifier does match the registered identifier 118A. In Wifi networks based on IEEE 802.11, the MAC address is the unique device identifier.

The transfer of the WEP, WPA, WPA2 key or other security key can be sent from the NAC 100A device to the NAC by any standard means. It can be embedded in a Web page, or by making a connection the a predetermined socket where an program in the client device 300 receives the data.

What is claimed is:

1. A device for providing network access control (NAC) comprising:
a first transceiver configured in access point mode thereby forming an unsecured-open-first wireless network, a second transceiver configured in client mode and configured to connect to a secured-second network, and a human-detectable-output device,
wherein the first transceiver and second transceiver are configured to conform with a same wireless-networking-protocol;
wherein the first transceiver is configured to establish a user client connection with a client device over the unsecured-open first network;
wherein a client-access-security key for the NAC device is output through the human-detectible-output device;
wherein the NAC device is configured to transmit to the client device, with the first transceiver and over the unsecured-open-first wireless network, a web page configured to accept a user-input-security key;
wherein the NAC device is configured to receive from the client device, over the unsecured-open-first wireless network, the user-input-security key;
wherein the NAC device is configured to receive a unique identifier from the client device which is connected to the NAC device over the unsecured-open-first wireless network; and
wherein the NAC device is configured to receive data from the first client device through the first transceiver and over the unsecure-open-first wireless network, and retransmit the data on the second transceiver over the secure-second network when the user-input-security key matches the client access security key.

2. The NAC device of claim 1, wherein the NAC device is configured to change at preconfigured times the client-access-security key and the changed client-access-security key output on the human-detectible-output device.

3. The NAC device of claim 1, wherein the NAC device is configured to restrict destination addresses to which data from the client connection is retransmitted.

4. The NAC device of claim 1, wherein the unique identifier is a client device media access control (MAC) address.

5. The NAC device of claim 3, wherein the destination addresses are one or more of a Uniform Resource Locator (URL), Internet Protocol (IP), or media access control (MAC) address.

6. The NAC device of claim 1, wherein the first and second transceiver wireless transmissions conform to the communication standards of IEEE 802.11(a, b, g, and n).

7. The NAC device of claim 1, wherein the output of the human-detectable-output device is by one or more of a visual display, an audio output, or a printed output.

8. The NAC device of claim 1, wherein one of the first transceiver or second transceiver is a virtual transceiver and the first transceiver and second transceiver receive and transmit over a same antenna and use a same radio frequency electronics.

9. The NAC device of claim 1, wherein the client-access-security key contains a network name of the second transceiver, wherein the client-access-security key is selected from a group consisting of a Wired Equivalent Privacy (WEP), Wi-Fi Protected Access (WPA), and WPA2 key for connecting to the secure-second network, and wherein the client identifier is a media access control (MAC) address.

10. The NAC device of claim 2, wherein the NAC device is further configured with a list of registered identifiers, wherein the NAC device is configured to compare the unique identifier with each identifier in the list of registered identifiers, and wherein if the unique identifier matches one of the registered identifiers, then information required to connect to the secure-second wireless network is transmitted from the NAC device to the connected client device.

11. The NAC device of claim 10, wherein the information to connect to the second network is a Wired Equivalent Privacy (WEP) key and network name.

12. A process to control wireless client device access to a network comprising the steps of:
configuring within an access-client device a first transceiver in a wireless access point mode thereby forming an unsecured open first wireless network;
forming a user client connection between a client device and the access-control device with the first transceiver over the unsecured-open-first wireless network;
outputting by the access control device a client-access-security key in a human detectable form;
configuring within the access-control device a second transceiver in a wireless client mode and connecting to a secure-second wireless network;
transmitting to the client device over the unsecured-open-first wireless network a web page configured to accept a user-input-security key;
receiving a client-device-unique identifier from the client device over the unsecure-open-first wireless network;
receiving by the access-control device over the unsecured-open-first wireless network and from the client-device data containing the user-input-security key; and
retransmitting by the access-control device data sent by the client device over the unsecure-open-first network and received by the first transceiver on the second transceiver over the secure-second network if the user-input-security key matches the client-access security key, wherein the configuring the first transceiver and second transceiver within the access-control device conform with a same networking protocol.

13. The process of claim 12, further comprising the steps of: changing the client-access-security key at preconfigured times; and outputting the changed client-access-security key in a human detectible manner.

14. The process of claim 12, further comprising the step of: restricting retransmission of data received on the user client connection based on a data destination address.

15. The process of claim 12, wherein the client-device-unique identifier is a client-device-media access control (MAC) address.

16. The process of claim 14, wherein the destination address is one or more of a Uniform Resource Locator (URL), Internet Protocol (IP), or media access control (MAC) address.

17. The process of claim 12, wherein the first and second transceiver are configured to implement the transmission standards and protocols of IEEE 802.11(a, b, g, and n).

18. The process of claim 12, wherein the output of the human-detectable device is by one or more of a visual display, an audio output, and a printed output.

19. The process of claim 12, wherein one of the first or second transceivers are configured to be a virtual transceiver, and wherein both the first and second transceiver share a same antenna and a same radio frequency electronics.

* * * * *